(12) United States Patent  (10) Patent No.: US 8,558,843 B2
Kinch  (45) Date of Patent: Oct. 15, 2013

(54) METHOD FOR IDENTIFYING, SELECTING AND MATCHING COLORS

(76) Inventor: Nicoline Kinch, Stockholm (SE)

( * ) Notice: Subject to any disclaimer, the term of this patent is extended or adjusted under 35 U.S.C. 154(b) by 213 days.

(21) Appl. No.: 12/985,369

(22) Filed: Jan. 6, 2011

(65) Prior Publication Data

US 2012/0050311 A1  Mar. 1, 2012

Related U.S. Application Data

(60) Provisional application No. 61/377,193, filed on Aug. 26, 2010.

(51) Int. Cl.
*G09G 5/02*  (2006.01)

(52) U.S. Cl.
USPC ........... 345/593; 345/594; 345/597; 345/598; 345/599; 434/98

(58) Field of Classification Search
USPC ..................... 345/589–604; 434/98
See application file for complete search history.

(56) References Cited

U.S. PATENT DOCUMENTS

| | | | |
|---|---|---|---|
| 640,792 A * | 1/1900 | Munsell | 446/243 |
| 2,184,125 A * | 12/1939 | Patterson | 434/104 |
| 4,169,285 A * | 9/1979 | Walker | 345/591 |
| 4,377,286 A * | 3/1983 | Constantinescu | 273/153 S |
| 4,695,832 A | 9/1987 | Jacobson | |
| 4,865,323 A | 9/1989 | Heusinkveld | |
| 6,518,948 B1 * | 2/2003 | Berstis | 345/107 |
| 6,924,817 B2 | 8/2005 | Rice et al. | |
| 7,180,524 B1 | 2/2007 | Dale | |
| 7,221,373 B2 | 5/2007 | Dornan et al. | |

FOREIGN PATENT DOCUMENTS

WO  2009034401  3/2009

OTHER PUBLICATIONS

Philipp Otto Runge; 1810; Farbenkugel http://irtel.uni-mannheim.de/colsys/RungeKugel.html.*

* cited by examiner

*Primary Examiner* — Xiao M. Wu
*Assistant Examiner* — Todd Buttram
(74) *Attorney, Agent, or Firm* — Fasth Law Offices; Rolf Fasth

(57) ABSTRACT

A color sphere has a plurality of organized color cells. The color cells are gradually lighter from a bottom to a top. A first color cell is selected from the color sphere. Radial, horizontal peripheral, vertical peripheral directions are identified relative to the first color cell. The color cells of the sphere are organized so that they only match in the radial direction, horizontal peripheral direction and in the vertical peripheral direction. A second color cell is selected only when the second color cell is in selected direction.

5 Claims, 2 Drawing Sheets

METHOD FOR IDENTIFYING, SELECTING AND MATCHING COLORS

PRIOR APPLICATION

This application is a U.S. utility patent application based on U.S. Provisional Patent Application Ser. No. 61/377,193, filed 26 Aug. 2010.

TECHNICAL FIELD

The invention relates to a method for identifying, selecting and matching colors.

BACKGROUND OF INVENTION

Most people find it difficult to understand how colors relate to each other and identify and match colors. In schools, teachers find it difficult to make the students understand how colors relate. Another example is stores that sell paint have two-dimensional color maps that show many color shades from which the customers must select colors. However, it is difficult for customers to know why, for example, yellow appears on several different color samples and what the difference is between these different "yellows", and why a color in one color map matches a second color in a different color map. An often expressed problem among vendors of paint is that the customer has a tendency to choose colors that are too intense. They realize the mistake afterwards, when the paint has already been applied. No system is effective and it is difficult for people to match colors despite the various prior efforts.

SUMMARY OF INVENTION

The method of the present invention provides a solution to the above-outlined problems. More particularly, the method is a three-dimensional method for identifying, selecting and matching colors. It can be virtual as well as physical. With the help of a system of coordinates, any shade can be identified. The color sphere has a plurality of organized color cells so that the top of the sphere is white and the bottom is black. The most intense color shades of blue, yellow and red are disposed around the "equator" of the sphere. These three colors form a triangle when seen from above. The sphere may be cut in any way desired since all colors in the interior of the sphere are also organized so that they relate to each other. Towards the core the color shades become more grayish color shades while the color shades closer to the periphery of the sphere are gradually less gray. An axis through the sphere extends from the white top to the black bottom so that the shades therebetween gradually changes from white to various gray color shades that get darker until it is black. The sphere may be treated as having a plurality of color cells that gradually get lighter from a bottom to a top of the sphere and more gray as the color cells are disposed closer to the core axis of the sphere.

In operation, a first color cell may be selected from the color sphere. A radial direction, a horizontal peripheral direction and a vertical peripheral direction are identified relative to the first color cell. The color cells of the color sphere only match in the radial, the horizontal peripheral and the vertical peripheral directions. A second color cell is selected only when the second color cell is in selected direction. The color sphere is openable to display color cells disposed inside the sphere.

DETAILED DESCRIPTION

Figure 1:
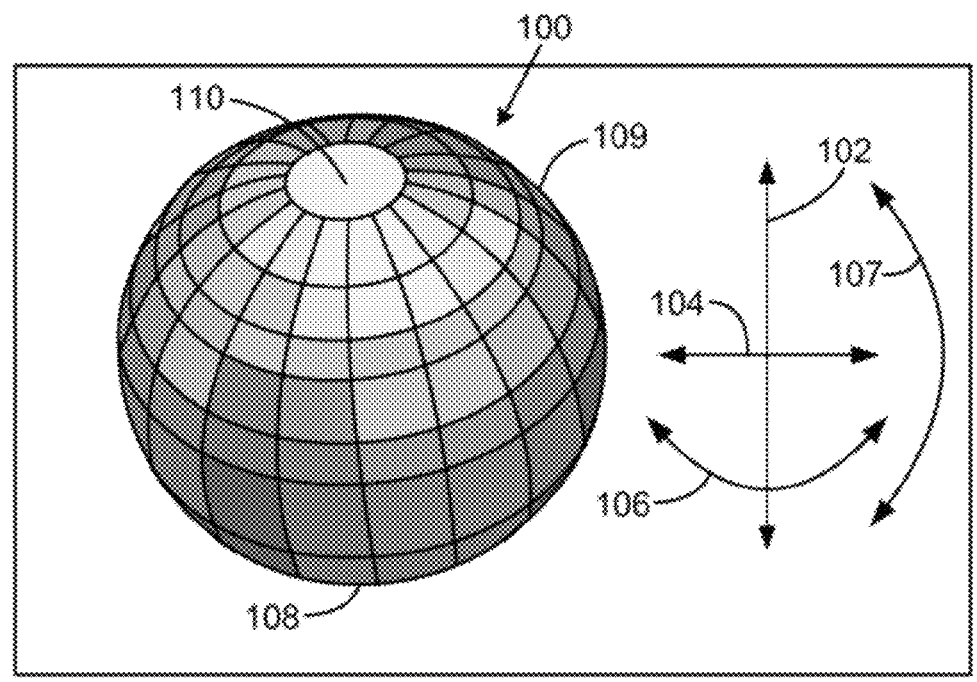
FIG. 1 is a schematic illustration of a portion of a color sphere of the present invention.

With reference to FIG. 1, the color sphere 100 of the present invention has a plurality of color cells or color shades that are organized. The color sphere 100 may also be virtual so that the user can easily "open up" the sphere to go inside the sphere by using a computer program. In this way, the user may effortlessly move inside the sphere to search for and identify the desired color shades. Preferably, the color cells are based on and organized according to three or triangular based colors namely yellow, red and blue. The change of the color change may also be continuous so that distinct color cells cannot be seen. The color sphere may be taken apart so that color cells disposed inside the sphere 100 are visible also. The sphere 100 has a peripheral surface 109 and all the visible colors organized in an axial direction 102, a radial direction 104, a horizontal peripheral direction 106 and a vertical peripheral direction 107. The color shades get lighter from a bottom 108 towards a top 110 of the sphere 100. An important and surprising realization or insight of the present invention is that colors match or are in harmony when they are disposed along the axial direction 102, the radial direction 104, the horizontal peripheral direction 106 and the vertical peripheral direction 107 relative to one another but not in any other direction. In other words, the color cells are organized in the sphere 100 so that by selecting one color shade the user may find another matching color shade by simply moving in the axial direction 102, the radial direction 104, the horizontal peripheral direction 106 or the vertical peripheral direction 107 to select another color shade in order to identify a color shade that matches the first selected color shade. It is of course also possible to find colors that are not in harmony with or match one another by using directions other than the directions 104, 106 and 107.

Figure 2:
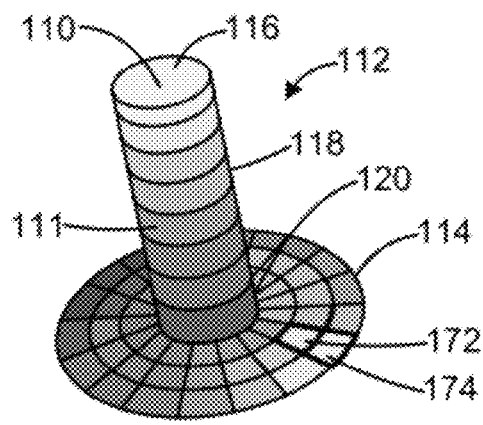
FIG. 2 is a schematic perspective top view of an axial portion of the color sphere of the present invention.

FIG. 2 is a perspective top view of an axial portion 112 including the core 111 of the sphere 100 that includes a bottom 114. The color shades of the axial portion 112 are organized so that they gradually change from a white shade 116 at the top 110 via gray shades 118 to a black shade 120 at the bottom 108 of the axial portion 112.

Figure 3:
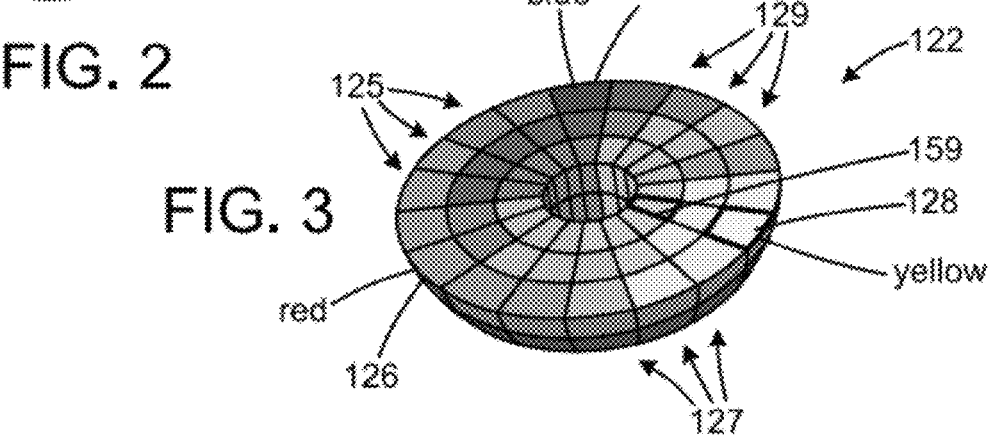
FIG. 3 is a schematic perspective top view of a lower segment of the color sphere of the present invention.

FIG. 3 is a perspective top view of a lower segment 122 disposed close to the bottom of the sphere 100 but above the bottom 114 shown in FIG. 2. The lower segment 122 has many color cells including a cell of a blue shade 124 and the color cells gradually change to a red shade 126 that gradually change to a yellow shade 128 along the horizontal peripheral direction 106. Similarly, the cells between the yellow shade 128 gradually change from the yellow shade 128 to the blue shade 124 in the direction 106. In this way, the color cells between the blue shade 124 and the yellow shade 128 are various shades of greenish colors 129 and the color cells between the blue shade 124 and the red shade 126 are various shades of purplish colors 125. Similarly, the color cells between the red shade 126 and the yellow shade 128 are various shades of orange colors 127. The colors between the orange and the black are various shades of brown. The same principle applies to color cells disposed closer to the core 111 in that they consists of more and more gray. The only difference of the color shades of the color cells between the visible top layer and the layers below the top layer is that the color shades in the lower levels are gradually darker as the layers get closer to the bottom black 114.

Figure 4:
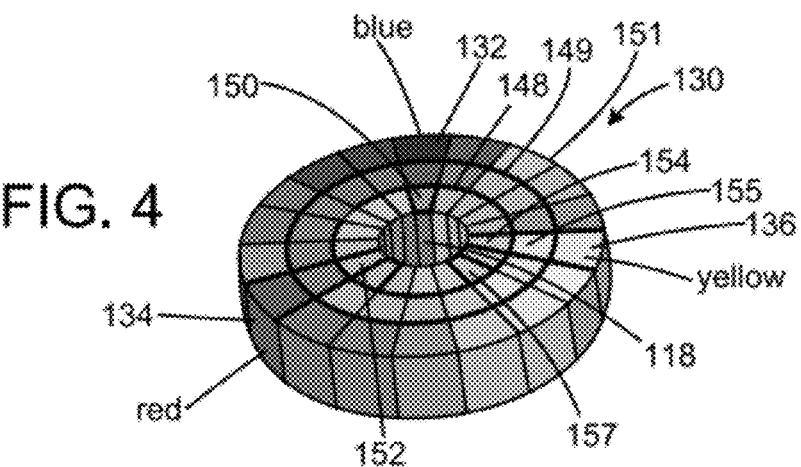
FIG. 4 is a schematic perspective top view of a mid-segment of the color sphere of the present invention.

FIG. 4 is a perspective top view of mid-segment 130. The outer periphery or the "equator" of the sphere 100 has the most intense colors. Similar to the bottom segment 122, the mid-segment 130 has many color cells including a blue shade 132, red shade 134 and a yellow shade 136. The blue shade 132 is slightly lighter than the blue shade 124 of the bottom segment 122 since the shades gradually change from darker shades at the bottom 108 to lighter shade at the top 110 of the entire sphere 100. The red shade 134 is therefore slightly lighter than the red shade 126 and the yellow shade 136 is slightly lighter than the yellow shade 128 of bottom segment 122. The inner wheel-shaped segment 148 has more of gray color shades than does the color shade in cell 149. However, the color shade 150 is a grayish/bluish shade because the peripheral cell 132 is blue. The color shade 152 includes a reddish gray because the peripheral cell 134 is red. Similarly, the color shade 154 includes a yellowish shade because the peripheral cell 136 is yellow. The same principle applies to all the color cells in the other segments such as the middle wheel-shaped segment 149 and the outer peripheral wheel-shaped segment 151. All horizontal peripheral "wheels" 106, such as like cells 149, 151 and 163 contain the same amount of gray and therefore match each other.

All the shades in the radial direction 104 also match one another. This means, for example, that all the color shades disposed radial direction extending from the color cell 144 towards color cell 161 match one another even when extended into the purple zone of color cells disposed on the other side of the core.

Figure 5:
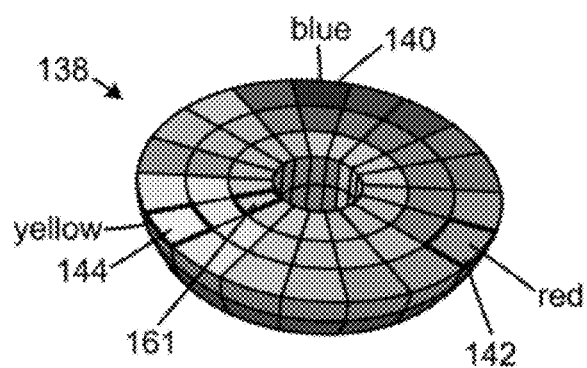
FIG. 5 is a schematic perspective bottom view of an upper segment of the color sphere of the present invention.

FIG. 5 is a bottom view of a top segment 138 that, in general, have lighter colors than the middle segment 130. The top segment 138 also has a lighter blue shade 140, a lighter red shade 142 and a lighter yellow shade 144 and various color shades therebetween, as explained above.

Figure 6:
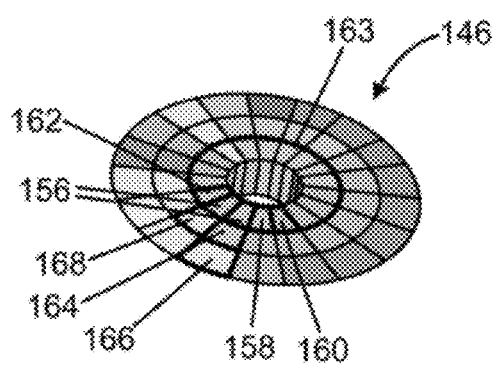
FIG. 6 is a schematic perspective bottom view of a top segment of the color sphere of the present invention.

FIG. 6 is a bottom view of a top 146 that has very light color shades but is organized in the same way as the segments 122, 130 and 138. As mentioned above, the important realization of the present invention is that certain color shades are in harmony or match while other color shades are not in harmony and that the matching colors can easily be found by moving in the directions 102, 104, 106 or 107 from the first selected color cell. For example, color cell 156 matches any other color in the peripheral direction 106 (see FIG. 1) so that color cell 156 are in harmony with and matches color cells 158, 160 and 162 and all the other color cells in the inner wheel-shaped segment 163. Color cell 156 is also in harmony color cells in the radial direction 104 (see FIG. 1) so that color cell 156 matches the color cells 164 and 166. However, color cell 156 is not in harmony with color cell 168 because color cell 168 is neither in the radial direction 104 nor in the peripheral direction 106 relative to color cell 156. It should be noted that color cell 156 is matching the corresponding cell of the top segment 138 in the vertical peripheral direction 107.

Colors are also in harmony and match one another in the axial direction 102. This means all the colors from the white shade 116 to the gray shades 118 and black shade 120 matches one another. The color shade 120 also matches, for example, all the color shades in the radial direction 104 such as color shades 172 and 174. In fact, the dark gray color shade 120 matches all the color shades in all the radial directions from the center and radially outwardly towards the periphery of the bottom 114.

In operation, the user may first select or identify color cell 154 in FIG. 4. In order to find a matching color the user may simply select any color in the radial direction 104, such as the color shade of color cell 155 or color cell 136, in the horizontal peripheral direction 106, such as color cell 157, or in the vertical peripheral direction 107, such as the yellowish color cell 159 shown in FIG. 3 or the yellowish color cell 161 shown in FIG. 5. It should be understood that any other color in the direction 104, 106 or 107 would be in harmony or match color cell 154. In this way, it is very easy for the user to select matching colors even if the colors are disposed far away from the selected color cell 154 in the sphere 100. The color sphere 100 of the present invention thus prevents the user from selecting mismatching colors i.e. color cells that are not disposed along any of the directions 102, 104, 106 or 107 relative to the first selected color shade used as the reference.

It is also possible to use the sphere 100 of the present invention as a learning tool to learn about colors and there relationships to one another. For example, it is possible to better understand what an apricot color consists of such as white plus yellow-red and how it relates to other color such as pink which may contain the same amount of white and red but no yellow. Brown may include the same amount of yellow-red and some black but no white etc. The sphere 100 may also be used as a three-dimensional puzzle wherein each piece may characterize a color shade. The pieces could be held together mechanically by fasteners or magnetism.

The sphere 100 may also be used to avoid the mistake of selecting a color that is too intense. For example, when a customer in a paint store has selected a color that, in the opinion of the sales clerk who may be more of an expert than the customer, is too intense, the sales clerk can easily recommend a color that is less intense by, for example, selecting a color in a radial inward direction. Of course, more intense colors may be selected by finding a color shade in the radial outward direction.

While the present invention has been described in accordance with preferred compositions and embodiments, it is to be understood that certain substitutions and alterations may be made thereto without departing from the spirit and scope of the following claims.

The invention claimed is:

1. A method for identifying and selecting a color or a combination of colors, in a computer, comprising:

providing a color sphere having a plurality of organized color cells, the color cells being gradually lighter from a bottom towards a top and gradually more gray from a peripheral surface towards a core, the color sphere having a lower segment being positioned below a mid-segment, the mid-segment having an outer equatorial periphery representing a largest diameter of the color sphere perpendicularly to the core, the lower segment being axially spaced apart from the mid-segment; identifying a radial direction, a horizontal peripheral direction or a vertical peripheral direction; organizing the color cells of the sphere so that the color cells only match in the radial direction, horizontal peripheral direction and in the vertical peripheral direction, the radial direction being a direction that is perpendicular to an axial direction of the core, the lower segment having a plane surface being perpendicular to the axial direction of the core, the lower segment having an inner wheel-shaped segment, a middle wheel-shaped segment surrounding the inner wheel-shaped segment, and an outer peripheral wheel-shaped segment surrounding the middle wheel-shaped segment, the inner wheel-shaped segment having color cells with a first amount of gray, the middle wheel-shaped segment having color cells with a second amount of gray and the outer peripheral segment having color cells with a third amount of gray, the first amount being greater than the second amount, the second amount being greater than the third amount, providing the mid-segment with a plane surface being perpendicular to the axial direction of the core, the mid-segment having an inner wheel-shaped segment, a middle wheel shaped segment surrounding the inner wheel-shaped segment, and an outer peripheral wheel-shaped segment surrounding the middle wheel-shaped segment, the inner wheel-shaped segment having color cells with the first amount of gray, the middle wheel-shaped segment having color cells with the second amount of gray and the outer peripheral segment having color cells with the third amount of gray, identifying a first color cell in the inner wheel-shaped segment on the plane surface of the lower segment inside an outer surface of the color sphere; identifying a second color cell in the inner wheel-shaped segment of the mid-segment, the second color cell being axially aligned with the first color cell, the second color cell having an amount of gray that is identical to an amount of gray of the first color cell, the second color cell having a color shade that is identical to the color shade of the first color cell, the first color cell being darker than the second color cell.

2. The method according to claim 1 wherein the method further comprises the step of placing a white shade at the top and a black shade at the bottom.

3. The method according to claim 1 wherein the method further comprises the step of making the color sphere openable to display color cells disposed below the peripheral surface within the sphere.

4. The method according to claim 1 wherein the method further comprises the step of placing color shades having the greatest intensity in the mid-segment.

5. A color sphere device, comprising:
a plurality of organized color cells, the color cells being gradually lighter from a bottom towards a top and gradually more gray from a peripheral surface towards a core, the color sphere having a lower segment being positioned below a mid-segment, the mid-segment having an outer equatorial periphery representing a largest diameter of the color sphere perpendicularly to the core, the lower segment being axially spaced apart from the mid-segment; the color sphere having a radial direction, a horizontal peripheral direction or a vertical peripheral direction; the color cells only matching in the radial direction, horizontal peripheral direction and in the vertical peripheral direction, the radial direction being a direction that is perpendicular to an axial direction of the core, the lower segment having a plane surface being perpendicular to the axial direction of the core, the lower segment having an inner wheel-shaped segment, a middle wheel-shaped segment surrounding the inner wheel-shaped segment, and an outer peripheral wheel-shaped segment surrounding the middle wheel-shaped segment, the inner wheel-shaped segment having color cells with a first amount of gray, the middle wheel-shaped segment having color cells with a second amount of gray and the outer peripheral segment having color cells with a third amount of gray, the first amount being greater than the second amount, the second amount being greater than the third amount, the mid-segment having a plane surface being perpendicular to the axial direction of the core, the mid-segment having an inner wheel-shaped segment, a middle wheel-shaped segment surrounding the inner wheel-shaped segment, and an outer peripheral wheel-shaped segment surrounding the middle wheel-shaped segment, the inner wheel-shaped segment having color cells with the first amount of gray, the middle wheel-shaped segment having color cells with the second amount of gray and the outer peripheral segment having color cells with the third amount of gray, the color sphere having a first color cell in the inner wheel-shaped segment on the plane surface of the lower segment inside an outer surface of the color sphere;

the color sphere having a second color cell in the inner wheel-shaped segment of the mid-segment, the second color cell being axially aligned with the first color cell, the second color cell having an amount of gray that is identical to an amount of gray of the first color cell, the second color cell having a color shade that is identical to the color shade of the first color cell, the first color cell being darker than the second color cell.

\* \* \* \* \*